Figure 1:
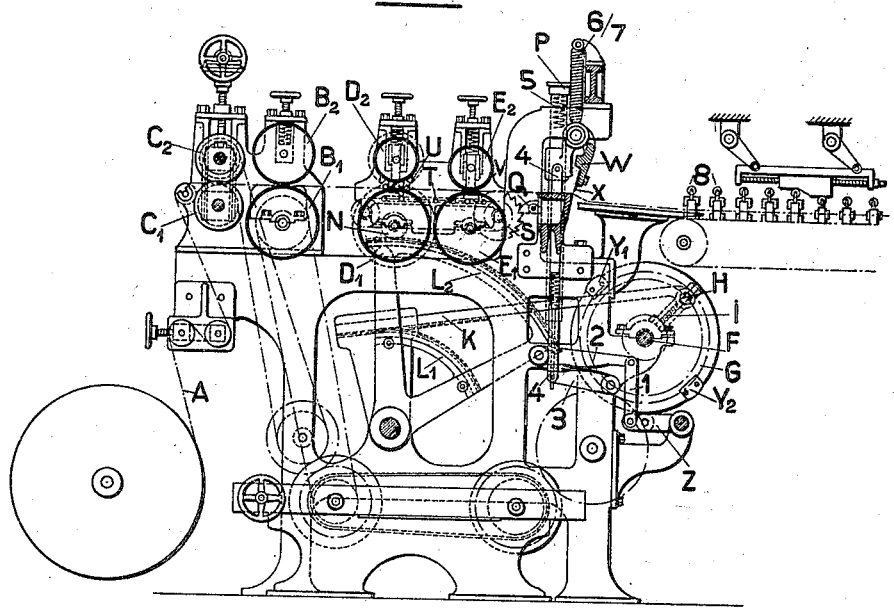

G. SPIESS.
PAPER CUTTING DEVICE.
APPLICATION FILED JULY 8, 1920.

1,400,777.

Patented Dec. 20, 1921.
2 SHEETS—SHEET 1.

Inventor:
Georg Spiess

G. SPIESS.
PAPER CUTTING DEVICE.
APPLICATION FILED JULY 8, 1920.
1,400,777.
Patented Dec. 20, 1921.
2 SHEETS—SHEET 2
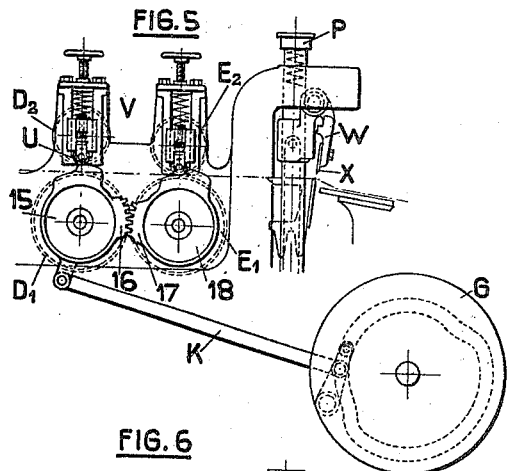
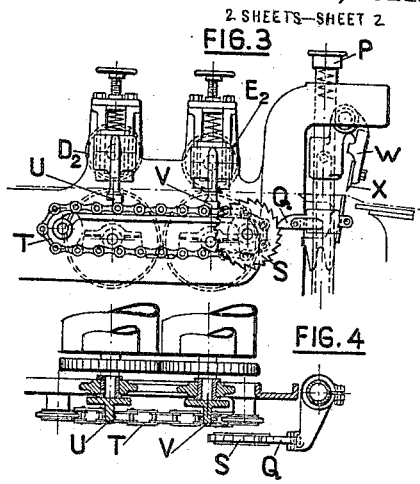
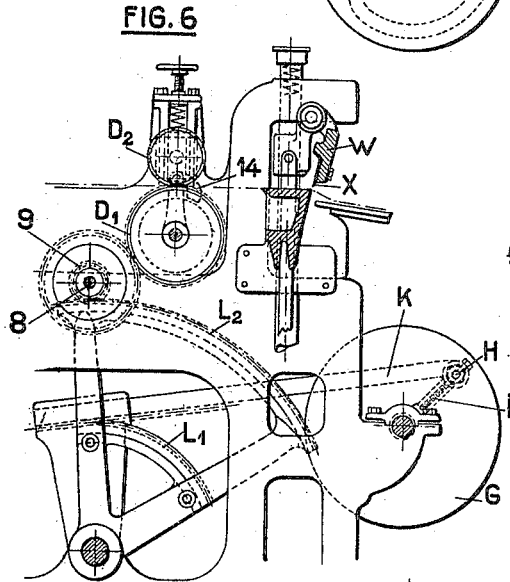
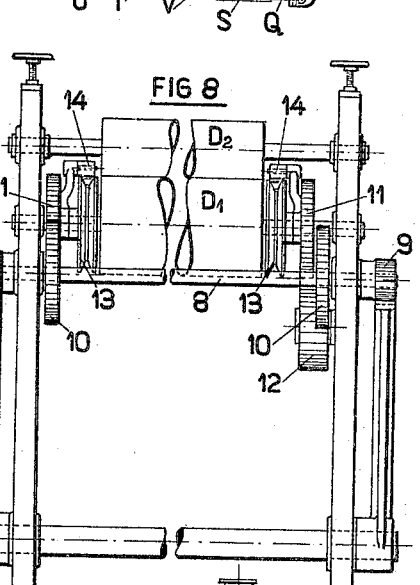
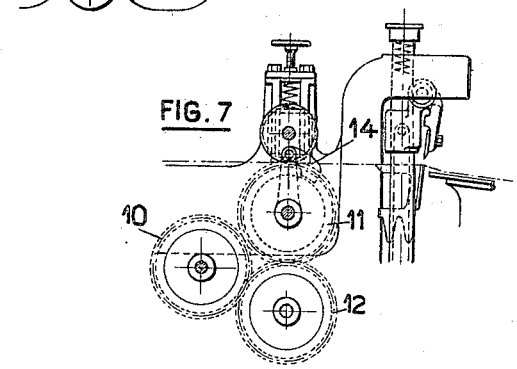
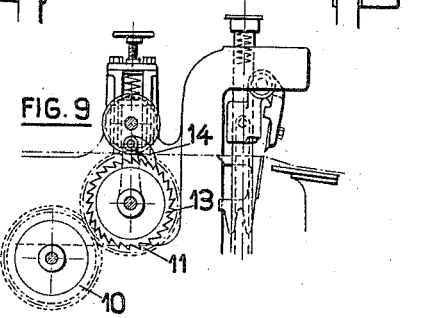
Inventor:
Georg Spiess.

UNITED STATES PATENT OFFICE.

GEORG SPIESS, OF LEIPZIG-REUDNITZ, GERMANY.

PAPER-CUTTING DEVICE.

1,400,777.  Specification of Letters Patent.  Patented Dec. 20, 1921.

Application filed July 8, 1920. Serial No. 394,848.

*To all whom it may concern:*

Be it known that I, GEORG SPIESS, a citizen of the German Republic, residing at Leipzig-Reudnitz, Germany, have invented certain new and useful Improvements in Paper-Cutting Devices, (for which I have filed an application in Germany, April 28, 1919,) of which the following is a specification.

The present invention has reference to certain new and useful improvements in machines for cutting paper, cardboard, and the like, and relates more particularly to a machine for cross-cutting a web of paper, fed continuously from a supply roll, in sections of equal lengths by means of a vertically reciprocating edge tool.

The various types of cutters now in use for the same purpose operate either with vertically reciprocating or with rotary knives. In some of them the cutting takes place during a stop in the feed of the web, which necessitates stopping and starting up the masses for each cutting operation. In others the web is seized by grippers, is drawn forward to the required extent, dropped and then cut, when the grippers with open jaws return for a new seizure. This arrangement requires relatively much power for clampingly and shiftingly operating the grippers. Again, other constructions make use of rotary cutting knives, which, as is well known, do not produce a clean cut.

The present invention, now, effectively obviates the various disadvantages attaching to prior machines of this character, by causing the web-feeding rolls to be momentarily arrested twice for each complete cycle of operation, that is to say for each single revolution of the main drive shaft, and the transverse cut to be executed during these short periods of inaction of the feed rolls, that is immediately before, during, or immediately after the arrest of the web feed, which allows the use of a reciprocatorily operating straight-edged knife with its well known advantages.

The momentary stoppage of the feed rolls is caused by the change of direction in the operation of a reciprocating intermediate gear actuated by the continuously rotating main drive, mechanism being provided to prevent the web feed from being interfered with by this reversal of the intermediate gear. This can be accomplished for instance by causing this intermediate gear to rotate the two feed roll pairs in opposite directions and to always throw out of action during this reversal of movement that pair which rotates in opposite direction to that of the paper feed, or by causing the rolls of a single pair of feed rolls to be rotated in relatively opposite direction by the reciprocating intermediate gear, without the rotary direction of the two feed rolls being reversed during the return stroke of the reciprocating intermediate gear.

My invention will best be understood when described in connection with the accompanying drawings, in which Figure 1 is a side elevation and Fig. 2 a plan of a preferred embodiment; Figs. 3 and 4 respectively are side view and plan, partly in section, of the lifting mechanism for the pressure rolls; Fig. 5 shows a fragmentary side view of a constructional detail; Figs. 6 and 8 respectively are side view and front view of a constructional modification, and Figs. 7 and 9 are details.

Figure 2:
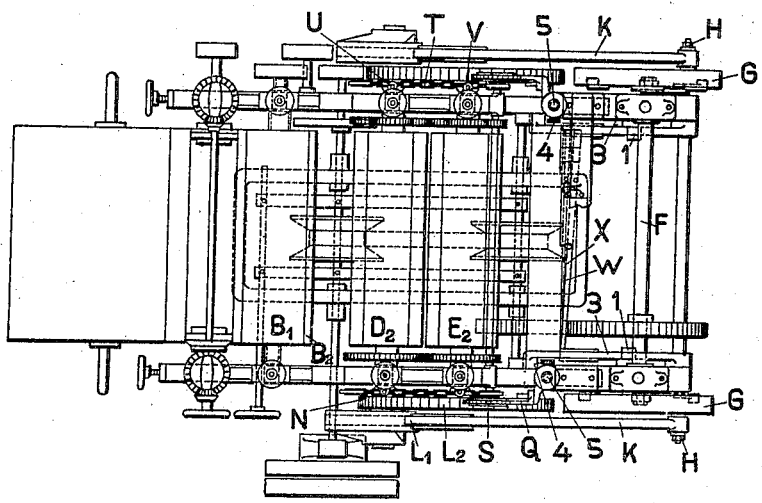

In the constructional embodiment according to Figs. 1 and 2 the paper web A, unwound from the supply roll by the pull exerted by the feed rolls $B^1$ and $B^2$, is first drawn through between the longitudinal cutter $C^1$, $C^2$, where it is cut along both longitudinal edges to the required width in well known manner. The web is then acted on by two pairs of feed rolls $D^1$, $D^2$ and $E^1$, $E^2$ respectively and is finally presented to the vertically reciprocating knife W, X where it is cut transversely into sheets. The last named two pairs of feed rolls are controlled from a crank disk G, fixed to the main drive shaft which is driven in any suitable manner. A connecting rod K is fulcrumed on this crank disk G by means of the pivot pin H which can be relatively displaced on the threaded spindle I in well known manner for varying the extent of the connecting rod stroke. The inner end of this rod is provided on its lower face with rack teeth designed for engagement with a toothed segment $L^1$ journaled in the machine frame. Coaxially with this segment $L^1$ is provided a larger toothed segment $L^2$ which meshes with a spur wheel N keyed on the shaft of the feed roll $D^1$. Obviously, on continuous rotation of the drive shaft F there will be imparted to the feed roll $D^1$ a reciprocatory rotary or oscillatory movement, which is then transmitted to the superimposed smaller feed or pressure roller $D^2$ by suitable spur gears, so that in accordance with the rocking movement of the segments the two rolls $D^1$ and $D^2$ are relatively rotated in oppositely reciprocatory manner. A second pair of feed rolls $E^1$, $E^2$ is arranged similarly to the pair $D^1$, $D^2$, and as the upper pressure rolls $D^2$ and $E^2$ of the two pairs are to be lifted off their respective lower rolls $D^1$ and $E^1$, as will presently be described, the meshing spur gears have relatively long teeth, which allow of this lifting movement without their intermeshing connection being interrupted. The lower feed roll $D^1$ is connected to the other lower feed roll $E^1$ by means of suitable spur gears.

The mechanism for temporarily lifting the upper pressure rolls of their respective companion rolls into inoperative position relative to the web, during the return stroke of the segment $L^1$, may be variously designed. In the embodiment shown by way of example in Fig. 3, a closed chain T is driven in stepwise manner by a ratchet wheel S being acted on by a pawl Q extending from a vertically reciprocating support P which carries the transverse knife beam W with the knife edge X. The design and operation of this pawl and ratchet mechanism is such that on each descent of the knife support P the chain is advanced by one-half the length of its link members. To the shaft bearings of the pressure rolls $D^2$ and $E^2$ are respectively secured the lifting rods U and V, whose lower cam heads extend into the path of the upper stretch of the chain T in such manner that when for instance the head of lifter U rests on a cross pin connecting two adjacent chain links, the other lifter V engages in the interspace between two adjacent link pins, and vice versa. In the former instance the roll $D^2$ will be lifted off the roll $D^1$, while the roll $E^2$ is pressed home on its companion roll $E^1$ by spring pressure.

The upper pressure rollers may be thus alternately lifted off their companion rolls also by other means, for instance by cam disks secured to the shafts of the rolls $D^1$ and $E^1$. In Fig. 5 in place of the crank disk G of Figs. 1 and 2, there is shown a grooved cam disk G by which an oscillatory motion is imparted over the connecting rod K to the cam disk 15, the toothed segment 16 of which meshes with the segment 17 of a similar cam disk 18. The cams of these disks alternately raise and lower the upper rolls in timed relation. The lower heads of the lifting rods U and V are preferably provided with rollers for frictionless coöperation with the link pins or cams. In the position illustrated the lifter U has run up on the apex of the cam of disk 15 and has lifted the upper pressure roll out of contact with the lower roll, while the rolls $E^1$ and $E^2$ are in close operative contact for feeding the paper web between them.

The transverse cutter may be of any suitable construction. In the preferred embodiment shown there is arranged above the lower stationary knife edge a knife beam W with the edge X. The vertically reciprocatory movement of this knife beam, obviously, must be effected extremely quickly to obtain a clean cut in the short time available. For this purpose there are provided on the crank disk G two cams $Y^1$ and $Y^2$, which successively coact with a roller of a lever 2, which latter by means of a link member 1 operates the rock lever 2. This latter lever transmits its rocking motion by rolling contact to the lower lever 3 to which in turn the lower end of a connecting rod 4 is fulcrumed. This rod 4 is attached to the transverse cutter support P. The return of this cutter support is caused by springs 5, 6 and 7 suitably disposed in the machine frame.

During the continuous rotation of the crank disk G the pairs of feed rolls $D^1$, $D^2$ and $E^1$, $E^2$ are alternately operated, as described, for feeding the paper web up to the knife, the one pair thereof, whose rotation is temporarily opposite to that of the paper feed, being always inoperative on the web which latter comes to rest on reversal of the feed roll movement, in which instant then the cutting knife is let down for severing the web, when the paper feed is resumed and the described operation repeated. The severed sheet is delivered to and seized by a gripping device 8 (Fig. 1) as well known in the art.

In place of the two pairs of feed rolls, as described, only one such pair may be used for intermittently feeding the paper web, as shown in the embodiment according to Figs. 6-9. The larger toothed segment in this instance meshes with a spur wheel 9 fixed on the shaft 8. A spur wheel 10 likewise fixed on this shaft transmits its oscillatory movement to the lower feed roll $D^1$, for instance by a spur wheel 11 which rides loosely on the shaft of the feed roll $D^1$. The wedge-shaped nose of a toggle clutch member 14 coöperates with a correspondingly circumferentially recessed clutch disk 13 (Fig. 8) fast on the feed roll shaft. During the clockwise movement of the clutch member 14 it will cause the feed roll $D^1$ to rotate correspondingly for feeding the web, while during its succeeding return rotation the parts are declutched and the feed roll will not be influenced by this clutch member. On the opposite side the clutch arrangement is identical with the exception that the spur wheel 11 is not directly driven by the gear 10 but by the intermediary of a toothed wheel 12, so that the clutching member 14 is then operated thereby for advancing the disk 13 in clockwise direction, while the clutch member on the other side is declutched and freely oscillates back. The arrangement, thus, is such that the clutch disks 13 are alternately acted on in a forward sense by the clutch members 14, which causes the feed roll $D^1$ to intermittently rotate always in clockwise direction, though its actuating mechanism performs oscillating movements.

In place of the clutch mechanism just described I may also use a pawl and ratchet device, such as shown by way of example in Fig. 9, in which the pawl 14 in its forward movement advances correspondingly the feed roll, but releases it during the return movement.

What I claim is:—

1. In a machine for cutting a continuous paper or the like web, including a transverse cutting device intermittently operated in vertically reciprocating manner, means for feeding the web to said transverse cutting device, actuating means for said feeding means, and means for momentarily arresting the feed movement of said feeding means twice for each complete operation of said actuating means and for feedingly operating said feeding means immediately following each such arrest, the different operations being so interdependent and timed that the cutting operation takes place during the momentary stoppages in the paper feed.

2. In a machine of the character set forth, in combination with an intermittently actuated transverse cutter, sets of feed rolls for feeding the web to said cutter, each set comprising a lower roll and a superimposed, yieldable pressure roll, spur wheels presenting relatively long teeth meshingly connecting said rolls, and spur wheels meshingly connecting the lower rolls of the sets, a main drive for imparting to one of said lower feed rolls a complete reciprocatory rotary movement with a reversal of movement and two stoppages for each single operation of said main drive, and means for alternately making one of said lower feed rolls inoperative for feed purposes during its return movement, the several mechanisms operating so interdependently and so timed that the cutting operation takes place during the momentary stoppages in the feed of the web caused by the reversal of movement in said feed rolls.

3. In a machine of the character set forth, in combination with a vertically reciprocating transverse cutter, two pairs of feed rolls for feeding the paper web to the said cutter, each pair comprising a lower feed roll and a yieldably superimposed pressure roll, spur wheels operatively connecting the upper and lower rolls in each pair, and spur wheels operatively connecting the adjacent lower rolls of the pairs, means for imparting to the roll pairs an oscillatory movement, comprising a drive shaft, a crank disk thereon, a connecting rod adjustably fulcrumed thereto at one end, rack teeth at the other end of said connecting rod, a toothed segment meshing with said rack teeth, a second toothed segment in rigid connection with the first said toothed segment and adapted to meshingly coöperate with one of said lower feed rolls, means for alternately moving out of coaction with its respective lower feed roll that upper pressure roll which is rotated in a sense opposite to the direction of the web feed, comprising a closed chain, means associated with said transverse cutter for advancing said chain in stepwise manner, and means associated with the bearings journaling said upper pressure rolls and adapted to be operated by said chain for alternately lifting said upper pressure rolls, the several parts being designed for timed coöperation as set forth.

4. In a machine of the character set forth, in combination with an intermittently actuated transverse cutter, feed rolls, and means feedingly actuating these feed rolls twice for each complete operative cycle of these actuating means for intermittently feeding the paper web to said transverse cutter, including an oscillatingly actuated toothed segment, a toothed wheel in mesh therewith and loosely riding on the shaft of the lower one of said feed rolls on one side thereof, a clutch member on said loose toothed wheel, circumferentially grooved clutch disks, one on either side of said lower feed roll and fast thereto, a second toothed wheel loosely riding on said lower feed roll shaft on the other side of this roll and adapted to be operated by said toothed segment in opposite direction to the first said loose toothed wheel, a clutch member associated with this second toothed wheel, said clutch members alternatingly advancingly coöperating with said grooved clutch disks for continuously feedingly actuating said feed rolls with but a momentary stoppage in this feed at each reversal of movement of said feed roll actuating means.

In testimony whereof I affix my signature.

GEORG SPIESS.